UNITED STATES PATENT OFFICE.

JOHN H. DAY, OF ALBANY, NEW YORK.

DRY-FLOUR PASTE.

SPECIFICATION forming part of Letters Patent No. 406,631, dated July 9, 1889.

Application filed March 27, 1889. Serial No. 304,980. (Specimens.)

*To all whom it may concern:*

Be it known that I, JOHN H. DAY, a citizen of the United States, residing at Albany, in the county of Albany and State of New York, have invented a new article of manufacture consisting of Flour Paste in a Powdered Form; and I do hereby declare that the following is a full, clear, and exact description of the invention, which will enable others skilled in the art to which it appertains to make and use the same.

The object of my invention is to provide a new article of manufacture consisting of flour paste in a dry powdered form, which, when diluted in either cold or warm water, may be used as an adhesive substance for securing paper to a wall, or for other similar purposes. To accomplish this object I take wheat or rye flour, glue, and alcohol, mixed usually in the following proportions, to wit: sixteen pounds of flour, one pound of glue, and one gill of alcohol; but I do not limit myself to these proportions. These or similar ingredients are diluted with water and cooked in the manner and to the degree usual in making flour paste. When the paste has been thus made, I evaporate the water from it in any suitable manner, leaving the residue a dry hard substance, which is ground by any suitable means to a fine powder.

It will be remembered that this powder is not a mixture of raw ingredients, which must be subjected to cooking before it can be used. On the contrary, it is a substance which is prepared and in condition to be put into immediate use. All that is necessary to do to make my paste ready for use is to mix it with water to the required consistence.

By the use of my paste heavy wall-paper can be successfully and satisfactorily attached to a wall, and will remain smooth and secure thereon.

The advantage of first cooking the paste and then drying it is that it renders the substance, when again in the liquid form, less "stringy" and it dries much more rapidly. If put on the wall when first made, as is done by the old method, a stringy mass is formed, especially when put on thick, as is the case when extremely heavy paper is to be used, and when the paper is brought into contact with it the paper is caused to puff up, the paste drawing it out of shape in drying, and the paste being so thick it takes a long time to dry, and in drying contracts to such an extent as to loosen the paper, make it uneven, and causes it to crumble off. The powdered paste dries quickly and is more homogeneous, it is not stringy and has less contractibility, the paper upon which it is used is unruffled, unloosened, and is held tenaciously to the wall.

The advantages of this new article of manufacture are many. It emits no stench, does not draw vermin, is easily stored and transported, can be made ready for use in a moment's time—in all of these respects different from the liquid paste as now used.

What I claim as my invention, and desire to secure by Letters Patent, is—

A new article of manufacture resulting from evaporating the moisture from liquid flour paste composed of flour, glue, and alcohol, and grinding the residue to a fine powder, substantially as described.

JOHN H. DAY.

Witnesses:
FREDERICK W. CAMERON,
SEYMOUR N. HARRIS.